United States Patent
Bhogal et al.

(10) Patent No.: US 9,342,542 B2
(45) Date of Patent: May 17, 2016

(54) ANALYTICS DRIVEN IN-MEMORY DATA GRID (IMDG) HYDRATION

(71) Applicant: International Business Machines Corporation, Armonk, NY (US)

(72) Inventors: Kulvir S. Bhogal, Fort Worth, TX (US); Nitin Gaur, Round Rock, TX (US); Christopher D. Johnson, Rochester, MN (US); Todd E. Kaplinger, Raleigh, NC (US)

(73) Assignee: International Business Machines Corporation, Armonk, NY (US)

(*) Notice: Subject to any disclaimer, the term of this patent is extended or adjusted under 35 U.S.C. 154(b) by 115 days.

(21) Appl. No.: 14/150,730

(22) Filed: Jan. 8, 2014

(65) Prior Publication Data

US 2015/0193351 A1     Jul. 9, 2015

(51) Int. Cl.
*G06F 12/08*     (2016.01)
*G06F 17/30*     (2006.01)

(52) U.S. Cl.
CPC ...... *G06F 17/30312* (2013.01); *G06F 12/0888* (2013.01); *G06F 12/0806* (2013.01); *G06F 12/0866* (2013.01)

(58) Field of Classification Search
CPC .......... G06F 17/30864; G06F 12/0806; G06F 12/0866; G06F 12/0888
USPC ................................... 711/118, 130; 707/769
See application file for complete search history.

(56) References Cited

U.S. PATENT DOCUMENTS

| | | | |
|---|---|---|---|
| 7,912,812 B2 | 3/2011 | Ramos et al. | |
| 2009/0177667 A1* | 7/2009 | Ramos et al. | 707/100 |
| 2012/0158805 A1* | 6/2012 | Andre et al. | 707/827 |
| 2012/0197840 A1* | 8/2012 | Oliver et al. | 707/613 |
| 2012/0278817 A1* | 11/2012 | Oliver et al. | 719/318 |
| 2013/0073809 A1* | 3/2013 | Antani et al. | 711/136 |
| 2014/0330767 A1* | 11/2014 | Fowler | 707/607 |

* cited by examiner

*Primary Examiner* — Than Nguyen
(74) *Attorney, Agent, or Firm* — Steven M. Greenberg, Esq.; CRGO Law

(57) ABSTRACT

Embodiments of the present invention provide a method, system and computer program product for analytics driven IMDG cache hydration. In an embodiment of the invention, a method of analytics driven IMDG cache hydration includes retrieving from an analytics engine data utilization metrics for data in a database of a DBMS, selecting a subset of the data according to the data utilization metrics, and hydrating an IMDG cache of the DBMS with the selected subset. In one aspect of the embodiment, the data utilization metrics indicate one of a frequency and a recency of retrieval of the data in the database. In another aspect of the embodiment, the method additionally includes adding subsequent data to the IMDG cache when the subsequent data has been requested for retrieval a threshold number of times.

6 Claims, 1 Drawing Sheet

ANALYTICS DRIVEN IN-MEMORY DATA GRID (IMDG) HYDRATION

BACKGROUND OF THE INVENTION

1. Field of the Invention

The present invention relates to database caching and more particularly to IMDG caching in a database management system.

2. Description of the Related Art

Memory cache technologies have formed an integral part of computer engineering and computer science for well over two decades. Initially embodied as part of the underlying hardware architecture of a data processing system, data caches and program instruction caches store often-accessed data and program instructions in fast memory for subsequent retrieval in lieu of retrieving the same data and instructions from slower memory stores. Consequently, substantial performance advantages have been obtained through the routine incorporation of cache technologies in computer designs.

An in-memory data grid (IMDG) is a data structure that resides entirely in random access memory (RAM), and is distributed amongst multiple servers. Recent advances in 64-bit and multi-core systems have made it practical to store terabytes of data completely in RAM, obviating the need for electromechanical mass storage media such as hard disks. Of note, an IMDG can support hundreds of thousands of in-memory data updates per second, and an IMDG can be clustered and scaled in ways that support large quantities of data. Specific advantages of IMDG technology include enhanced performance because data can be written to, and read from, memory much faster than is possible with a hard disk. Further, an IMDG can be easily scaled, and upgrades can be easily implemented.

To achieve optimal performance for database driven applications, database driven applications typically institute a caching layer between the end user and the underlying database. Further, to achieve particular performance advantages, the caching layer can utilize an IMDG. The IMDG can be hydrated—that is populated with data—in one of two ways, preload or at runtime.

In a preload scenario, prior to runtime it can be determined which data in the database is most likely to be requested and that data can be preloaded into the IMDG. For instance, the preloaded data can be based upon a selection of columns and tables that are considered most active by the administrator configuring the caching policy. In doing so, however, the selection is based upon estimated usage and not any verifiable data.

In contrast, a runtime cache policy is typically performed as an item is requested from the cache and the entry is not found. Once the item is found in the database, the cache is populated with the entry and is evicted at some point based upon some preset policy. Of course, in the runtime scenario, the entry in the cache may never be requested again and will remain in the cache until evicted.

BRIEF SUMMARY OF THE INVENTION

Embodiments of the present invention address deficiencies of the art in respect to IMDG cache hydration and provide a novel and non-obvious method, system and computer program product for analytics driven IMDG cache hydration. In an embodiment of the invention, a method of analytics driven IMDG cache hydration includes retrieving from an analytics engine data utilization metrics for data in a database of a DBMS, selecting a subset of the data according to the data utilization metrics, and hydrating an IMDG cache of the DBMS with the selected subset. In one aspect of the embodiment, the data utilization metrics indicate one of a frequency and a recency of retrieval of the data in the database. In another aspect of the embodiment, the method additionally includes adding subsequent data to the IMDG cache when the subsequent data has been requested for retrieval a threshold number of times.

In another embodiment of the invention, a DBMS can be configured for analytics driven hydration of an IMDG cache of the DBMS. The system can include a database, a DBMS executing in memory of a host computing system and managing access to the database, an IMDG cache for the DBMS and an analytics engine coupled to the DBMS and analyzing access to data in the database. The system also can include an IMDG hydration module coupled to the DBMS, the IMDG cache and the analytics engine. The module can include program code enable to retrieve from the analytics engine data utilization metrics for the data in the database of the DBMS, to select a subset of the data according to the data utilization metrics, and to hydrate the IMDG cache of the DBMS with the selected subset.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for analytics driven IMDG cache hydration. In accordance with an embodiment of the invention, a DBMS can be enabled to utilize a caching layer implemented by an IMDG. The IMDG in turn can consult an analytics engine for data utilization information pertaining to the data in one or more database tables managed in the DBMS in order to determine data for use in hydrating the IMDG. For example, data disposed in particular columns and rows of one or more tables of the database or database tables of the DBMS can be identified as most recently use, or most frequently used, or a combination thereof. The identified data can be then placed into the IMDG during the hydration of the IMDG. In this way, the decision of what data to cache in the IMDG can be determined based upon actual data usage.

Figure 1:
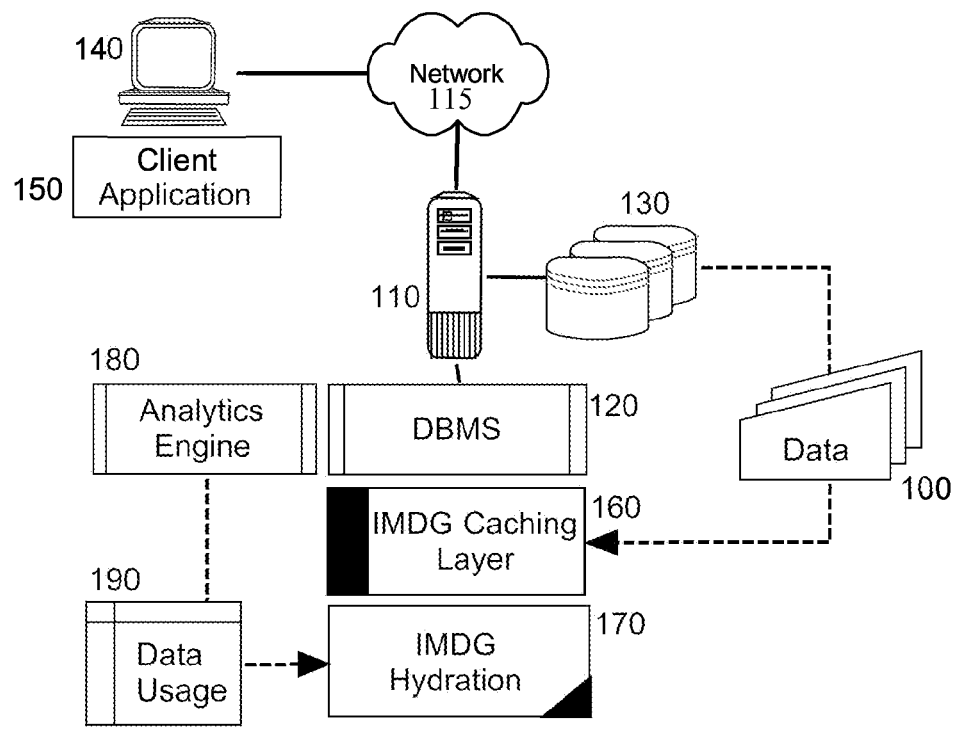
FIG. 1 is a schematic illustration of a DBMS configured for analytics driven IMDG cache hydration; and, FIG. 2 is a flow chart illustrating a process for analytics driven IMDG cache hydration.

In further illustration, FIG. 1 schematically shows a DBMS 120 configured for analytics driven IMDG cache hydration. As shown in FIG. 1, the DBMS 120 can include a host computing system 110 that can include one or more computers each with at least one processor and memory. The host computing system 110 can be communicatively coupled to one or more different client computers 140 over a computer communications network 115. The host computing system 110 also can support the operation of a DBMS 120 managing access by a client application 150 in a corresponding one of the client computers 140 to data in one or more databases 130 coupled to the host computing system 110.

Of note, the DBMS 120 can include an IMDG caching layer 160 utilizing an IMDG to act as cache memory to the DBMS 120. Also, an analytics engine 180 can be coupled to the DBMS 120 and configured to track utilization metrics 190 of data in the one or more databases 130 of the DBMS. The utilization metrics 190 can include data that is determined to be most recently used, most frequently used or both. Finally, an IMDG hydration module 170 can be coupled to each of the analytics engine 180 and the IMDG caching layer 160. The IMDG hydration module 170 can include program code that when executed in the memory of the host computing system 110 can be enabled to utilize the utilization metrics 190 of the analytics engine 190 to select particular data 100 of the one or more databases 130 for use in hydrating the IMDG caching layer 160.

Figure 2:
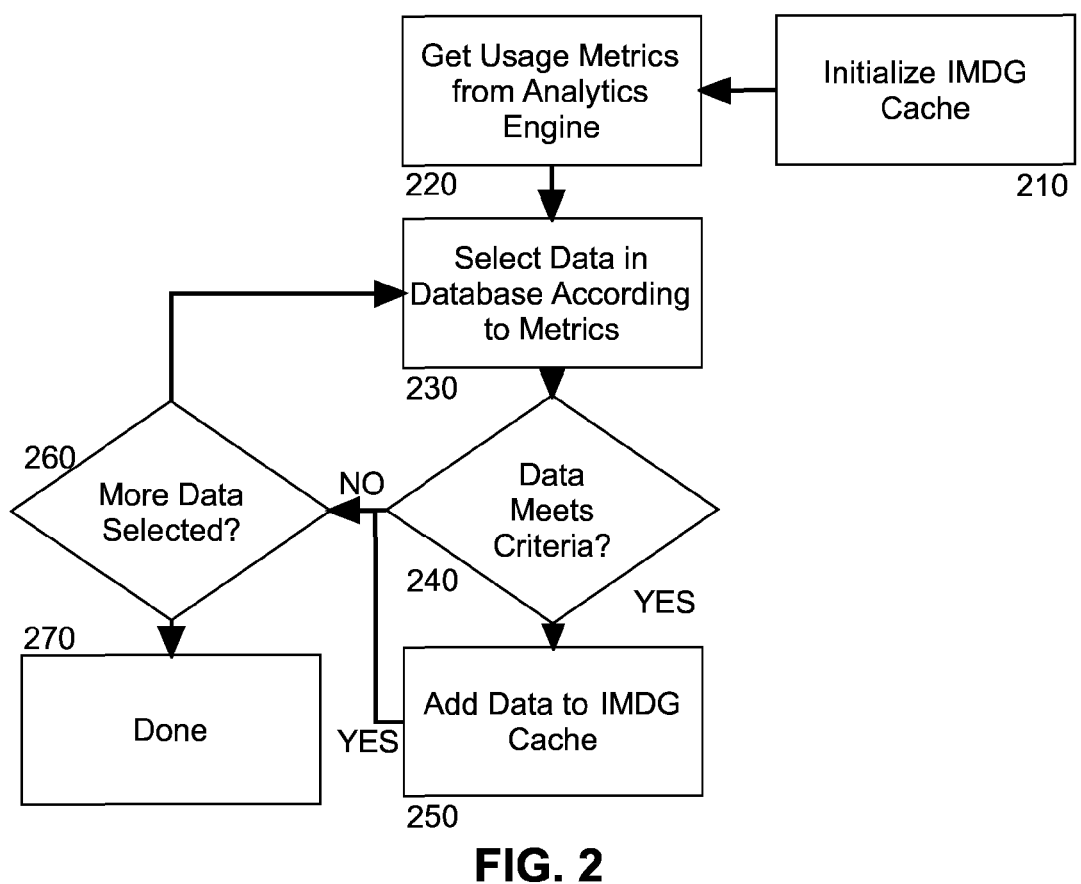

In yet further illustration of the operation of the IMDG hydration module 170, FIG. 2 is a flow chart illustrating a process for analytics driven IMDG cache hydration. Beginning in block 210, an IMDG cache can be initialized in a DBMS to act as a caching layer for the DBMS. In block 220, utilization metrics can be acquired from an analytics engine in respect to data in a database of the DBMS, and in block 230, the utilization metrics can be analyzed to determine data in the database most suitable for hydrating the IMDG cache. However, the determined data can be tested against a caching rule in decision block 240.

More specifically, the caching rule can specify that determined data is not to be placed in the IMDG cache, whether during hydration or subsequent to hydration, until the determined data has been requested a threshold number of times. In decision block 240, if the determined data meets the caching rule, then in block 250 the determined data can be added to the IMDG cache. In any event in decision block 260, it can be determined whether or not additional determined data remains to be considered for use in hydrating the IMDG cache. If so, the process can return to block 230 with the selection of additional data determined to be of interest in accordance with the utilization metrics provided by the analytics engine. When no more determined data remains to be considered, the process can end in block 270.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method of analytics driven in memory data grid (IMDG) cache hydration, the method comprising:
    retrieving from an analytics engine data utilization metrics for data in a database of a database management system (DBMS);
    selecting a subset of the data according to the data utilization metrics;
    testing the selected subset of the data against a caching rule to determine whether the selected subset of the data meets the caching rule;
    hydrating an IMDG cache of the DBMS with the selected subset upon determining that the selected subset of the data meets the caching rule.

2. The method of claim 1, wherein the data utilization metrics indicate at least one of a frequency and a recency of retrieval of the data in the database.

3. The method of claim 1, further comprising adding subsequent data to the IMDG cache when the subsequent data has been requested for retrieval a threshold number of times.

4. A database management system (DBMS) configured for analytics driven hydration of an in memory data grid (IMDG) cache of the DBMS, the system comprising:
    a database;
    a DBMS executing in memory of a host computing system and managing access to the database;
    an IMDG cache for the DBMS;
    an analytics engine coupled to the DBMS and analyzing access to data in the database; and,
    an IMDG hydration module coupled to the DBMS, the IMDG cache and the analytics engine, the IMDG hydration module comprising program code enable to retrieve from the analytics engine data utilization metrics for the data in the database of the DBMS, to select a subset of the data according to the data utilization metrics, to test the selected subset of the data against a caching rule to determine whether the selected subset of the data meets the caching rule, and to hydrate the IMDG cache of the DBMS with the selected subset upon determining that the selected subset of the data meets the caching rule.

5. The system of claim 4, wherein the data utilization metrics indicate at least one of a frequency and a recency of retrieval of the data in the database.

6. The system of claim 4, wherein the program code of the IDMG hydration module is further enabled to add subsequent data to the IMDG cache when the subsequent data has been requested for retrieval a threshold number of times.

* * * * *